V. E. EDWARDS.
FEEDING MECHANISM FOR METAL CUTTING SHEARS.
APPLICATION FILED NOV. 24, 1914.
1,228,543.
Patented June 5, 1917.
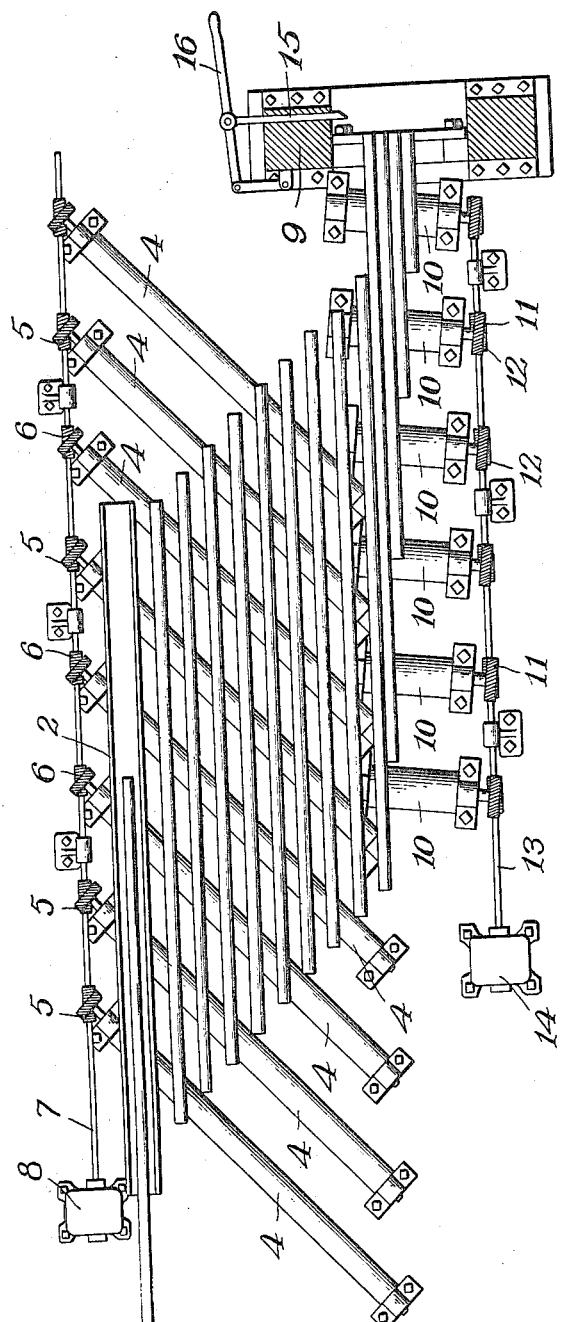
Witnesses.
R. D. Tobman
Penelope Cumberbach.
Inventor
Victor E. Edwards
By Fowler & Kennedy
Attorneys.

UNITED STATES PATENT OFFICE.

VICTOR E. EDWARDS, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

FEEDING MECHANISM FOR METAL-CUTTING SHEARS.

1,228,543.

Specification of Letters Patent. Patented June 5, 1917.

Application filed November 24, 1914. Serial No. 873,816.

*To all whom it may concern:*

Be it known that I, VICTOR E. EDWARDS, a citizen of the United States, residing at Worcester, in the county of Worcester and Commonwealth of Massachusetts, have invented a new and useful Improvement in Feeding Mechanism for Metal-Cutting Shears, of which the following, taken in connection with the accompanying drawings, is a specification.

The present invention relates to a feeding mechanism for metal cutting shears, adapted to submit a plurality of bars simultaneously to the action of the shear blades, whereby successive shearing operations, each resulting in the production of a plurality of pieces of predetermined and equal length, are effected.

In multiple shearing operations, as heretofore practised in connection with hot rolling mills, it has been customary to roll long bars and to feed them consecutively across a cooling bed. After thus being partially cooled, the bars are assembled side by side until the desired number are obtained. This group of bars is then transferred either sidewise or endwise to a front shear table, and the bars are then cut in multiple to the desired length.

A cooling bed sufficiently generous to cool the bars to atmospheric temperature, is of course impracticable. The bars must be cut while yet quite warm or even hot, and in every high tonnage mill a large number of bars must be cut at once in order to keep clear of the mill. For example, it is common practice to cut from twenty to thirty small bars at once. These bars are rolled two or three per minute, so that the bar first rolled in the group to be sheared may have ten or fifteen minutes more cooling than the last bar in said group. On a small and overworked cooling bed there might not be more than twenty or thirty bars, so that under the above not uncommon conditions, the last bar of the group would have had not over half the cooling time of the first bar of the group. Consequently, the shrinkage after cutting is not constant, and cannot be allowed for, or in other words, while the pieces are all of uniform length when cut, they are far from uniform length when cooled to normal temperature.

The present invention contemplates a marked improvement, by so feeding the bars to the shears that each bar shall have the same time interval for cooling. In other words, the present invention permits multiple shearing without the intervention of, and the objections to, an assembling table.

In the accompanying drawings, the figure is a plan view of one embodiment of such a mechanism, shown in connection with any well known type of "flying" shear which is of sufficient width to receive a plurality of bars, the showing of said shear being wholly diagrammatic; it is to be understood, however, that my invention is not limited to the particular mechanism shown and described, but is susceptible of variation from the same, within the scope of the claims annexed hereto.

In the said figure, the numeral 1 represents the final or finishing pass of a continuous rolling mill, adapted for the continuous reduction of billets or the like, to bars of a desired cross section. Each bar, as it emerges from said mill, is received upon a "hot run-out" or conveyer 2, of ordinary construction, and is immediately transferred sidewise from said hot-run, by any of the well-known devices for this purpose, to make room for the next succeeding bar. As hot run-outs, and means for discharging them broadside, are old and well known, and as the same form no part of the present invention, the details of this hot run-out and its discharging mechanism are omitted to avoid confusion.

Beneath said run-out 2 are disposed a plurality of conveying rolls 4, 4, constituting a broadside transfer mechanism, said rolls having their axes parallel to each other, and at an acute angle to the axial line of the bars deposited thereon from the hot run-out. At their corresponding ends these rolls 4 carry gears 5 which mesh with spaced gears 6 on a common shaft 7 driven from a motor 8. This motor may be run either continuously or intermittently, and needs to run only fast enough to move each bar sidewise on the rolls 4 the distance of its own width, before the next bar is deposited thereon. The action of the rolls 4, 4 is to impart to the bars a combined forward and lateral motion, as will be clearly understood from an inspection of the figure. The result of such action is two-fold; the longitudinal component of the motion advances each bar slightly ahead of the next succeeding bar, and the lateral component of said motion moves each bar broadside to space the same slightly from the next succeeding bar.

The shear, which may be the well known type of "flying" shear, adapted to operate while the metal is in motion, is indicated diagrammatically at 9; the approach table therefor consists of a series of conveyer rolls 10, 10, on which the bars are received as they leave the rolls 4, 4 of the broadside transfer mechanism. The rolls 10 are skewed in the same direction, but to a lesser degree, than the rolls 4, and are rotated usually intermittently, at a considerably higher rate of speed than said rolls 4, through pinions 11, meshing with gears 12 on a common shaft 13, driven by a motor 14. Due to the very slight skewing of the rolls 10, the broadside movement of said bars is slower than that imparted by the rolls 4, with the result that the gaps between successive bars become closed, as the same are advanced toward the shear 9, as clearly shown in the figure.

Means are preferably provided for "cropping" the advancing end of each bar, as it is moved forward by the rolls 10 between the shear knives; and it is essential to the efficient operation of the present mechanism that such short crop end be removed by the same operation of the shear which cuts full length pieces from the other bars on the approach table. To this end, I provide means for stopping each bar after its first end has been moved a few inches past the shear knives. Such means is shown as consisting of an end stop 15, movable horizontally from the rear by means of a lever 16, but it is to be understood that any other means, capable of bringing the bar to a stop after its advancing end projects a given distance beyond the shear knives, may be employed. The stop 15 engages the first end of each fresh bar, while permitting all the other bars on the approach table to move forwardly without interruption against the usual shear stop, or gage, not shown. The subsequent operation of the shear effects the removal of the crop end simultaneously with the cutting of pieces of the desired length from each of the other bars on the table. The stop 15 may be disposed at a fixed distance, say six inches, in advance of the shear knives, but preferably it is mounted for adjustment toward and from said knives.

The combined result of the operation of the broadside transfer and of the approach table is to advance the bars continuously toward the shear in overlapped or shingled relation, as clearly shown in the figure. The skew of the shear approach table roll 10 is such that a line from the back end of the roll 10 farthest from the shear and at right angles to the axis of said roll, will pass near the front end of the shear knives. Hence each full length bar moves on the shear approach table so that its forward end is operated upon by the effective portion of the shear blades nearest the broadside transfer, while its rear end is operated upon by the effective portion of the shear blades farthest from the broadside transfer. Each full length bar thus makes a complete traversing movement across the shear knives during its period of shearing, in which the shear knives are caused to operate intermittently, at predetermined intervals, as will be clearly understood. The paths of all the bars are identical, from the time they leave the finishing pass of the mill; and periods of time consumed for the traverse of said paths are the same in the case of each bar. Consequently, less difference exists in the shrinkage of pieces cut off from different bars by the multiple operation of the shear than in multiple shearing operations heretofore practised.

I claim,

1. In apparatus of the character described, the combination with a shear, of means for feeding bars, in multiple, to said shear, comprising a plurality of series of conveyer rolls, having their axes skewed with respect to the axes of the bars advanced thereon, the rolls of one series being skewed at a different angle from the rolls of another series.

2. In apparatus of the character described, the combination with a shear, of means for feeding bars, in multiple, to said shear, comprising an initial and a final series of conveyer rolls having their axes skewed with respect to the axes of the bars advanced thereon, the rolls of the final series having a less skew than the rolls of the initial series.

3. In apparatus of the character described, the combination with a shear, of means for feeding bars, in multiple, to said shear, comprising a series of conveyer rolls having their axes at an oblique angle to the axes of the bars advanced thereon, whereby a combined endwise and sidewise movement is imparted to each bar, and means for delivering bars broadside to said rolls.

4. In apparatus of the class described, the combination with a shear, of a shear approach table to which successive bars are delivered broadside, said table comprising a series of skewed rolls, whereby the broadside movement of the bars is continued, in conjunction with their longitudinal movement, in overlapping relation toward the shear.

5. In apparatus of the class described, the combination with a shear, of a shear approach table to which successive bars are delivered broadside, said table comprising a series of skewed rolls, and means for rotating said rolls at a speed so related to the speed of broadside delivery that a plurality of bars, in overlapping relation, are continuously advanced thereon.

6. In apparatus of the character described, the combination with a shear, of means for feeding bars in multiple to said shear, said feeding means comprising a series of conveyer rolls having their axes skewed with respect to the axes of the bars advanced thereon, a second series of conveyer rolls for delivering bars successively to said first series, the rolls of the second series being skewed at a greater angle than the rolls of the first series, and means for rotating the rolls of the first series at a higher speed than the rolls of the second series.

7. The combination with a broadside transfer mechanism having means for imparting a combined endwise and sidewise movement to successive longitudinally fed bars, of a shear approach table having means for continuing the combined endwise and sidewise movement of the bars delivered thereto by said broadside transfer mechanism, said shear approach table comprising means for increasing the endwise component of said movement.

8. The combination, with a shear, of a shear approach table to which successive bars are delivered broadside, means for feeding said bars longitudinally in multiple to said shear, and simultaneously moving them broadside across said table, and means for interrupting the forward movement of each fresh bar received on said table, whereby the operation of the shear removes the crop end of said bar.

9. The combination with a broadside transfer mechanism for imparting a combined endwise and sidewise movement to successive longitudinally fed bars, of a shear approach table for continuing the combined endwise and sidewise movement of the bars delivered thereto by said broadside transfer mechanism, said shear approach table comprising means for decreasing the sidewise component of said movement.

10. The combination with a broadside transfer mechanism for imparting a combined endwise and sidewise movement to successive longitudinally fed bars, of a shear approach table for continuing the combined endwise and sidewise movement of the bars delivered thereto by said broadside transfer mechanism, said shear approach table comprising means for increasing the endwise component of said movement, and for decreasing the sidewise component of said movement.

11. In apparatus of the character described, the combination with a shear, of means for moving successive longitudinally fed bars, in similar paths, toward said shear, by a combined endwise and sidewise movement, whereby each bar is offset longitudinally and laterally from the next preceding bar, and means for increasing the endwise component and decreasing the sidewise component of said movement, as each bar is brought into alinement with the shear, whereby a plurality of bars are fed, in multiple, and in overlapping relation, to said shear.

Dated this twenty-first day of November 1914.

VICTOR E. EDWARDS.

Witnesses:
WILLARD A. WINN,
PAULINE HAAS.